US005223684A

United States Patent [19]

Li et al.

[11] Patent Number: 5,223,684
[45] Date of Patent: Jun. 29, 1993

[54] METHOD AND APPARATUS FOR DIELECTRICALLY HEATING AN ADHESIVE

[75] Inventors: Chi Li, Orchard Lake; Ray A. Dickie, Northville Township, Wayne County; Fred G. Oblinger, Livonia, all of Mich.

[73] Assignee: Ford Motor Company, Dearborn, Mich.

[21] Appl. No.: 696,486

[22] Filed: May 6, 1991

[51] Int. Cl.$^5$ ............................................. H05B 6/54
[52] U.S. Cl. ............................. 219/10.81; 219/10.53; 156/274.4; 156/380.4
[58] Field of Search ............... 219/10.81, 10.53, 10.41, 219/10.75, 10.67, 10.57; 156/272.2, 272.4, 273.7, 274.4, 274.6, 274.8, 380.2, 380.3, 380.4, 380.5, 380.6, 380.7, 380.8

[56] References Cited

U.S. PATENT DOCUMENTS

| | | |
|---|---|---|
| 2,473,188 | 6/1949 | Albin . |
| 2,504,754 | 4/1950 | Sweeny . |
| 2,920,172 | 1/1960 | Stallard ............................ 219/10.81 |
| 3,291,671 | 12/1966 | Hecht . |
| 4,036,676 | 7/1977 | Pennington ...................... 219/10.53 |
| 4,221,950 | 9/1980 | Lamberts et al. ................ 219/10.81 |
| 4,293,363 | 10/1981 | Wakabayashi et al. . |
| 4,320,276 | 3/1982 | Takeuchi et al. . |
| 4,427,865 | 1/1984 | Watanabe . |
| 4,602,139 | 7/1986 | Hutton et al. . |
| 4,626,642 | 12/1986 | Wang et al. . |
| 4,650,947 | 3/1987 | Hutton et al. . |
| 4,654,495 | 3/1987 | Hutton et al. . |
| 4,749,833 | 6/1988 | Novorsky et al. . |
| 4,762,864 | 8/1988 | Goel et al. . |
| 4,771,150 | 9/1988 | Kon ................................... 219/10.41 |
| 4,776,915 | 10/1988 | Natori et al. . |
| 4,798,925 | 1/1989 | Ishizaka . |
| 4,814,587 | 6/1986 | Carter . |
| 4,816,633 | 3/1989 | Mucha et al. . |
| 4,878,978 | 11/1989 | Goel et al. . |
| 4,941,936 | 7/1990 | Wilkinson et al. ............... 156/274.8 |
| 4,941,937 | 7/1990 | Iseler et al. ...................... 156/274.8 |

FOREIGN PATENT DOCUMENTS

| | | |
|---|---|---|
| 800129 | 11/1968 | Canada . |
| 0339493 | 2/1989 | European Pat. Off. . |
| 0339494 | 2/1989 | European Pat. Off. . |

OTHER PUBLICATIONS

D. Holliday and R. Resnick, *Physics*, (John Wiley and Sons), 1978, Chapters 28 and 29.

*Primary Examiner*—Philip H. Leung
*Attorney, Agent, or Firm*—Damian Porcari; Roger L. May

[57] ABSTRACT

The present invention provides for a method of dielectrically heating an adhesive between first and second members by first placing an adhesive bead between mating surfaces of the first and second member. A first electrode is placed adjacent to the first member and a high frequency electric field is applied between the first electrode and a second electrode sufficient to dielectrically heat the adhesive.

6 Claims, 3 Drawing Sheets

METHOD AND APPARATUS FOR DIELECTRICALLY HEATING AN ADHESIVE

This invention relates to commonly assigned copending U.S. applications Ser. No. 07/633,742 titled "DIELECTRIC CURING OF ADHESIVES" and Ser. No. 07/632,830 titled "REVERSIBLE ATTACHMENT USING DIELECTRIC HEATING."

FIELD OF THE INVENTION

The present invention relates to fringe field dielectric heating of an adhesive. More specifically, the invention relates to using a segmented electrode adjacent an automotive lamp reflector creating a fringe electric field for heating a thermosetting adhesive.

BACKGROUND OF THE INVENTION

U.S. Pat. Nos. 4,941,936 and 4,941,937 both issued Jul. 17, 1990 teach a method of heating an adhesive between two fiber reinforced plastic members using a high frequency electric field. The electric field causes the dielectric heating of the adhesive between the fiber reinforced plastic members. The members are placed between two electrodes and an electric field is passed linearly from the top electrode through the members to the bottom electrode.

The present invention is specifically intended for the manufacture of automotive headlamp assemblies. Current automotive headlamps are manufactured by bonding a metallized reflector to a transparent lens. Both the reflector and the lens are generally made of a thermoplastic material such as polycarbonate. A two component epoxy adhesive is placed between the lens and reflector and allowed to cure. After the lamp assembly has cured, it is pressurized to approximately 5 p.s.i. to detect any adhesive failures or leakage. Pressure testing of the lamp assembly requires sufficient cure of the adhesive to withstand the increased pressure.

It is an object of the present invention to provide a rapid method of curing an adhesive between two thermoplastic members. It is another object of the present invention to provide a method for dielectrically heating an adhesive using a fringe electric field. It is a further object of the present invention to provide a method for dielectrically heating an adhesive between an automotive reflector and lens assembly.

SUMMARY OF THE INVENTION

The present invention provides for a method of dielectrically heating an adhesive between first and second members by first placing an adhesive bead between mating surfaces of the first and second member. A first electrode is placed adjacent to the first member and a high frequency electric field is applied between the first electrode and a second electrode sufficient to dielectrically heat the adhesive.

The invention also provides an apparatus for bonding a first member to a second member wherein the first member has structural portions overlying mating surfaces of the first and second members. The apparatus comprises a segmented electrode having two or more pieces. The pieces are moveable between an open and a closed position. The segmented electrode is spaced adjacent the structural portions of the first member when the pieces are in the closed position. A moving means moves the pieces between opened and closed positions. A second electrode is spaced parallel to the segmented electrode. One or more high frequency generators are connected between the segmented and second electrodes. The generator supplies a high frequency electric field which is sufficient to heat a dielectrically heatable adhesive positioned between the mating surfaces.

Conventional dielectric heating techniques teach the application of a high frequency electric field to heat a material placed between two electrodes. On modern automotive headlamp assemblies, it is often difficult or impossible to position an electrode overlying both surfaces of a bond line. Brackets and supporting structures on the automotive reflector often directly overlie the bond line. In an attempt to reduce the overall height profile of a lamp assembly, the perimeter lip portion of a lens has been reduced or eliminated. The typical structure of an automotive reflector and lens assembly do not permit the placement of electrodes to overlie mating surfaces between the lens and reflector.

The present invention utilizes the fringe electric field between two electrodes to dielectrically heat an adhesive placed adjacent the electrodes. Fringe field dielectric heating is herein defined as the dielectric heating of a material spaced adjacent two electrodes. The electric field dielectrically heating the adhesive travels in an arcuate path adjacent one or both of the electrodes.

To utilize fringe field dielectric heating, it is necessary to space the electrodes as near to the bond line as possible. In situations where structural portions such as brackets or structural members overlie the bond line, an electrode made up of two or more pieces is necessary. An electrode comprising two or more Pieces is herein defined as segmented. The pieces are electrically connected to one another and the electric field generated by a segmented electrode is essentially the same as that generated by a one-piece electrode.

The pieces are moveable between an open and a closed position. The reflector is placed between the open pieces. The pieces are moved to their closed position so as to closely follow the perimeter of the reflector. An adhesive is placed between mating surfaces of the reflector and lens. The lens is placed within a second electrode. The second electrode may be either segmented or unsegmented depending upon the design of the particular lens. A high frequency electric field between 10 and 100 MHz is applied between the segmented and second electrode. An electric field traveling in an arcuate path between the segmented and second electrode passes through mating surfaces of the reflector and lens and dielectrically heats the adhesive.

The adhesive can be 60 to 85 percent cured after only 10 to 20 seconds, depending on the specific adhesive, electrode configuration and electric field strength. This permits the near simultaneous bonding and pressure testing of a lens assembly without removing the assembly from the fixturing tool or waiting an extended period of time for the adhesive to cure. Bonding failures may be diagnosed quickly and reduce the overall volume of rejected parts.

Segmenting the electrode permits the use of dielectric heating for applications previously thought unsuitable. Applications where structural portions overlie bond lines may still be dielectrically heated using fringe field dielectric heating. These as well as other objects features and advantages of the present invention will become more apparent to one skilled in the art by reference to the accompanying drawings and detailed description.

DETAILED DESCRIPTION OF THE DRAWINGS

Figure 1:
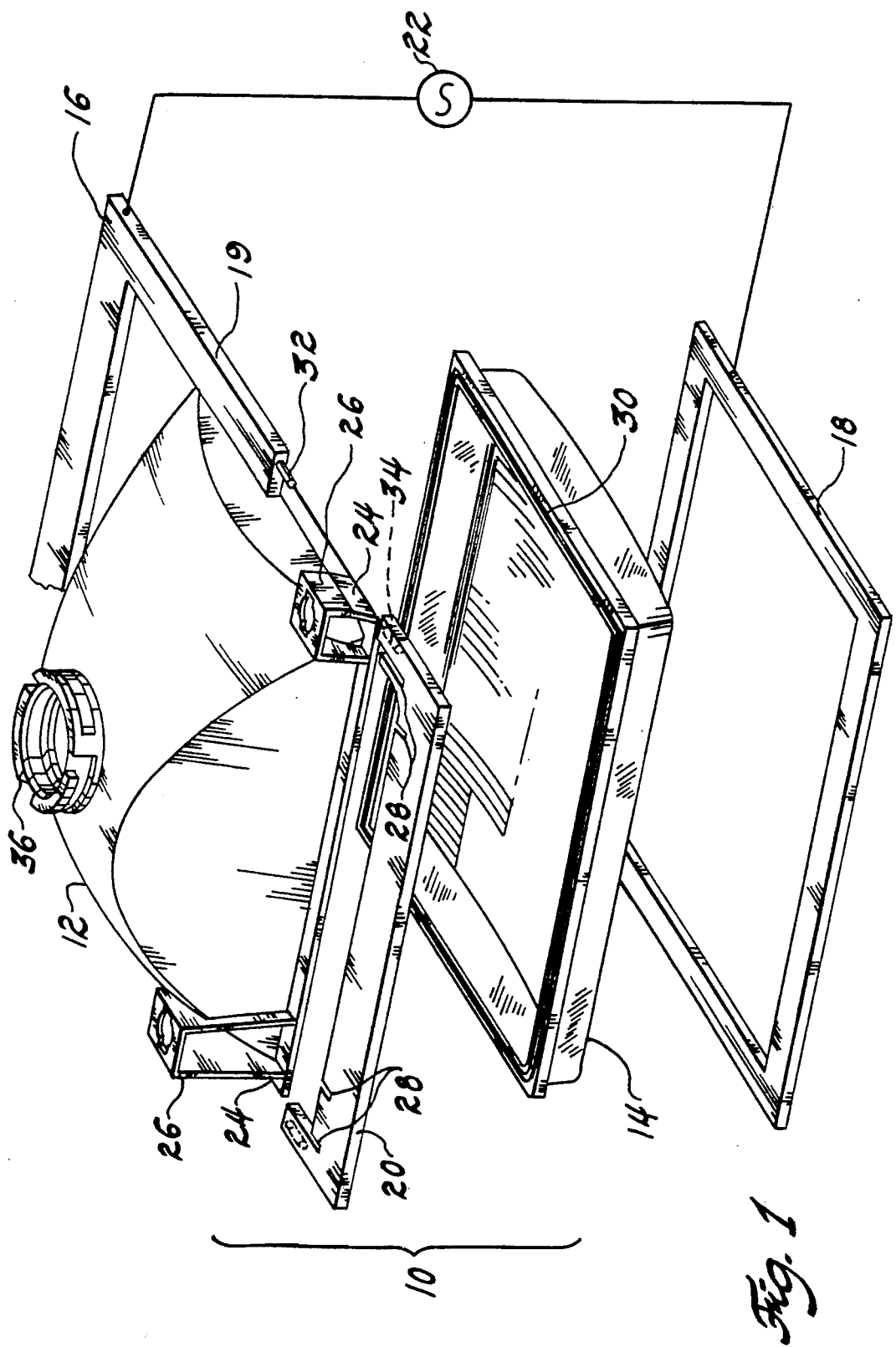
FIG. 1 is an exploded view of the bonding apparatus of the present invention.

FIG. 1 shows an exploded view of an automotive headlamp assembly 10 including reflector 12 and lens 14. A bead of dielectrically heatable adhesive is placed between mating surfaces of reflector 12 and lens 14. Suitable adhesives include epoxy and urethane adhesives. Of those commercially available, a two-component epoxy adhesive, Fusor 320/322, manufactured by Lord Chemical Company and two-component urethane adhesive, PG-6500 manufactured by Ashland Chemical Company are suitable with the present invention. Other types of thermoset as well as thermoplastic adhesives which are responsive to dielectric heating are also suitable in the present invention.

Lens 14 is generally made of a transparent polycarbonate material having a glass transition temperature ($T_g$) of approximately 150° C. Reflector 12 is manufactured from a polycarbonate based material and has a $T_g$ of approximately 145° C. The interior surface of reflector 12 (not shown) is aluminized to provide a reflective surface. Brackets 26 are used to attach headlamp assembly 10 to a vehicle. Brackets 26 contain structural portions 24 which overlie the mating surfaces of lens 14 and reflector 12.

Lens 14 has a generally rectangular shape. Lens 14 is received by electrode 18. The interior of electrode 18 closely follows the exterior perimeter of lens 14.

Segmented electrode 16 is made from two pieces 19, 20. Pieces 19, 20 are moveable between an open and a closed position. Pins 32 are received by sockets 34 to form an integral electrically connected electrode when in the closed position. Cut-out sections 28 permit segmented electrode 16 to closely overlie the perimeter portion of reflector 12. Cut-out sections 28 receive structural portions 24.

Segmented electrode 16 is affixed to a tool (not shown) which permits the relative movement between pieces 19 and 20. Pieces 19 and 20 are moveable between an open position and a closed position. Suitable means for moving pieces 19 and 20 include cylinders and motors. Such means are well known in the art of tooling design.

A high frequency electric generator 22 electrically connects segmented electrode 16 and electrode 18. Generator 22 is capable of operating between the frequencies of 10 MHz and 100 MHz and between 1,000 and 30,000 volts. Suitable commercially available high frequency electric generator with a pneumatic press is manufactured by Kabar Manufacturing Company, Farmingville, N.Y.

Figure 2:
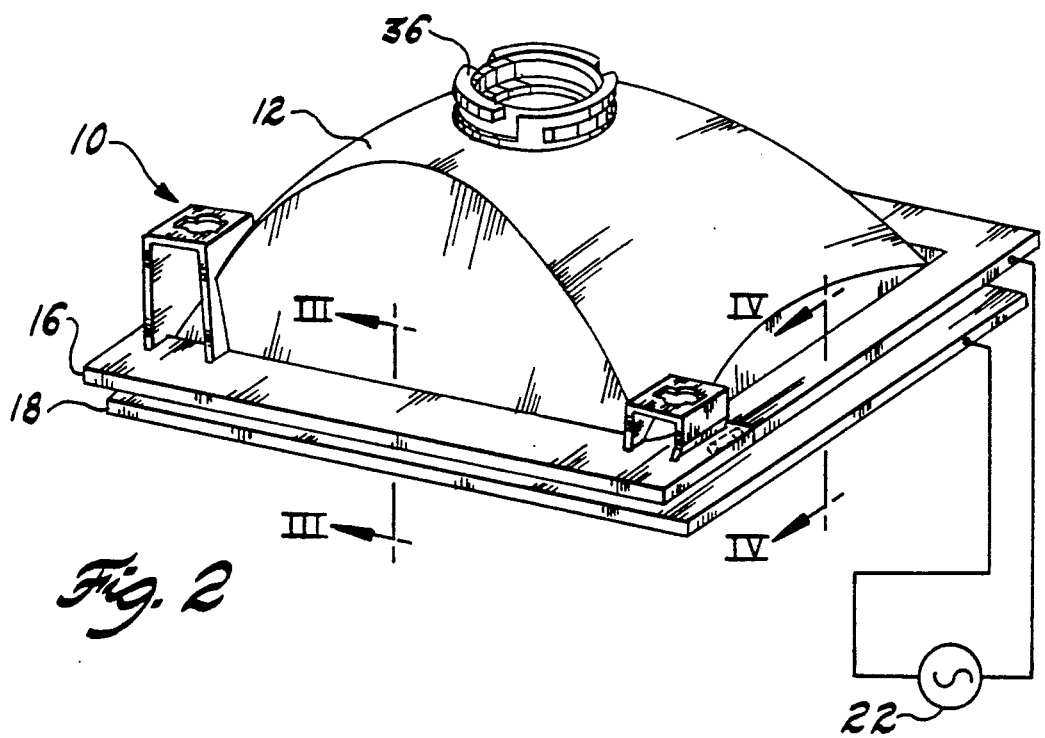
FIG. 2 is a perspective view of an automotive lens assembly undergoing dielectric heating.

Electrode 18 receives lens 14. A bead of dielectrically heatable adhesive 30 is placed between mating surfaces of lens 14 and reflector 12. With pieces 19, 20 in the open position, reflector 12 is placed on lens 14. A pneumatic press urges reflector 12 onto lens 14 as shown in FIG. 2. Pieces 19 and 20 are moved to a closed position around the perimeter of reflector 12. An electric field of approximately 27.12 MHz is applied between electrodes 16, 18 for approximately 10 to 60 seconds.

The electric field is sufficient to raise the curing temperature of adhesive 30 to approximately 150 to 175° C. After this time, adhesive 30 has sufficiently cured to provide a pressure resistant bond between reflector 12 and lens 14. Lens assembly 10 may be subjected to pressure testing through bulb socket 36. This pressure testing includes applying a positive air pressure of approximately 5 psi to the interior portion of lens assembly 10.

Figure 3:
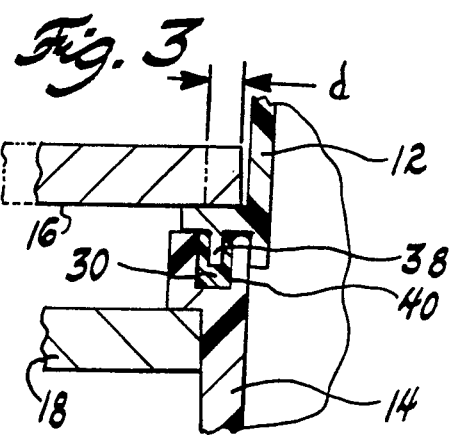
FIG. 3 is a cross-sectional view of the automotive lens assembly taken along the line III—III in FIG. 2.
Figure 4:
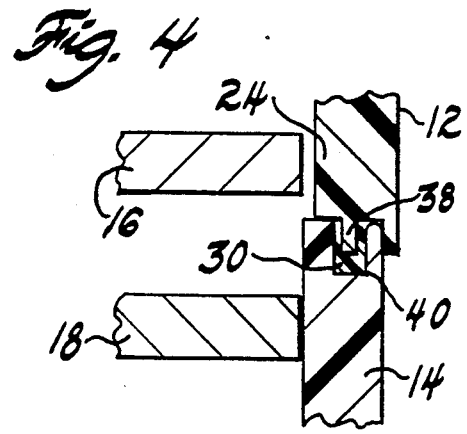
FIG. 4 is a cross-sectional view of the automotive lens assembly taken along the line IV—IV of FIG. 2.

Adhesive 30 is heated by an electric field. Shown in FIGS. 3 and 4 are cross-sectional views of lens assembly 10 undergoing dielectric heating. Shown in FIG. 3 is a sectional view along the line III—III in FIG. 2. Lens 14 comprises a U-shaped channel 40 which receives a projection 38 on reflector 12. Within U-shaped channel 40 is adhesive 30. Channel 40 and projection 38 provide the mating surfaces between lens 14 and reflector 12. The mating surfaces between channel 40 and projection 38 has been illustrated in FIG. 1 as having a generally planar shape, but these mating surfaces maybe contoured to have a three dimensional shape.

Segmented electrode 16 overlies projection 38. Electrode 18 partially overlies channel 40. At least a portion of the electric field between electrode 18 and segmented electrode 16 travels linearly through adhesive 30.

Shown in FIG. 4 is a sectional view of lens assembly 10 taken along the line IV—IV in FIG. 2. Reflector 12 includes structural portions 24. Lens 14 does not contain a lip area to permit electrode 18 to partially overlie channel 40. The interior portions of electrodes 16 and 18 are substantially vertically aligned. The electrical field passing through adhesive 30 must travel in an arcuate path between electrode 18 and segmented electrode 16.

Figure 5:
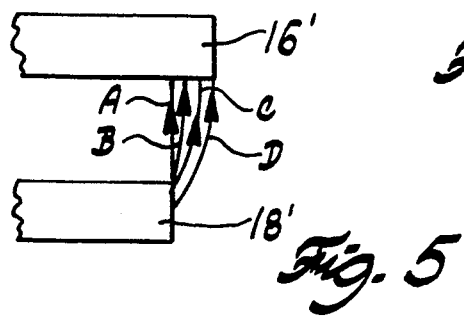
FIG. 5 shows fringe electric fields for evenly spaced electrodes.
Figure 6:
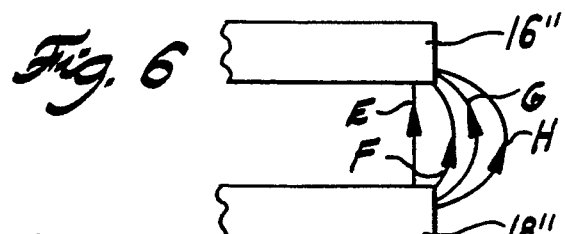
FIG. 6 shows fringe electric fields for staggered electrodes.

It is known that the electric field between two oppositely charged points includes a portion which travels in an arcuate path between the charged points. See D. Halliday and R. Resnick, *Physics*, (John Wiley and Sons, 1978, Chapters 28 and 29 herein incorporated by reference. This arcuate path is herein referred to as fringe electric fields. Shown in FIGS. 5 and 6 is a graphic representation of fringe electric fields. FIG. 5 shows an electric field between two vertically aligned electrodes. Electric field vector A shows a linear path between the positively charged electrode to the negatively charged electrode. The electric field adjacent the electrodes becomes weaker in intensity and more arcuate in shape. Electric field vectors B, C, and D show the electric field adjacent the electrodes 16′, 18′.

FIG. 6 shows an electric field between staggered electrodes. Electric field vector E shows a linear electric field between the positive electrode and negative electrode. Electric field vectors F, G, and H show the electric field adjacent the electrodes 16″, 18″. A similar electric field would exist when the polarity of the electrodes is reversed. FIGS. 5 and 6 demonstrate the ability of an electric field to extend adjacent to the electrodes. This phenomenon permits the dielectric heating of a material spaced adjacent the electrodes.

Figure 7:
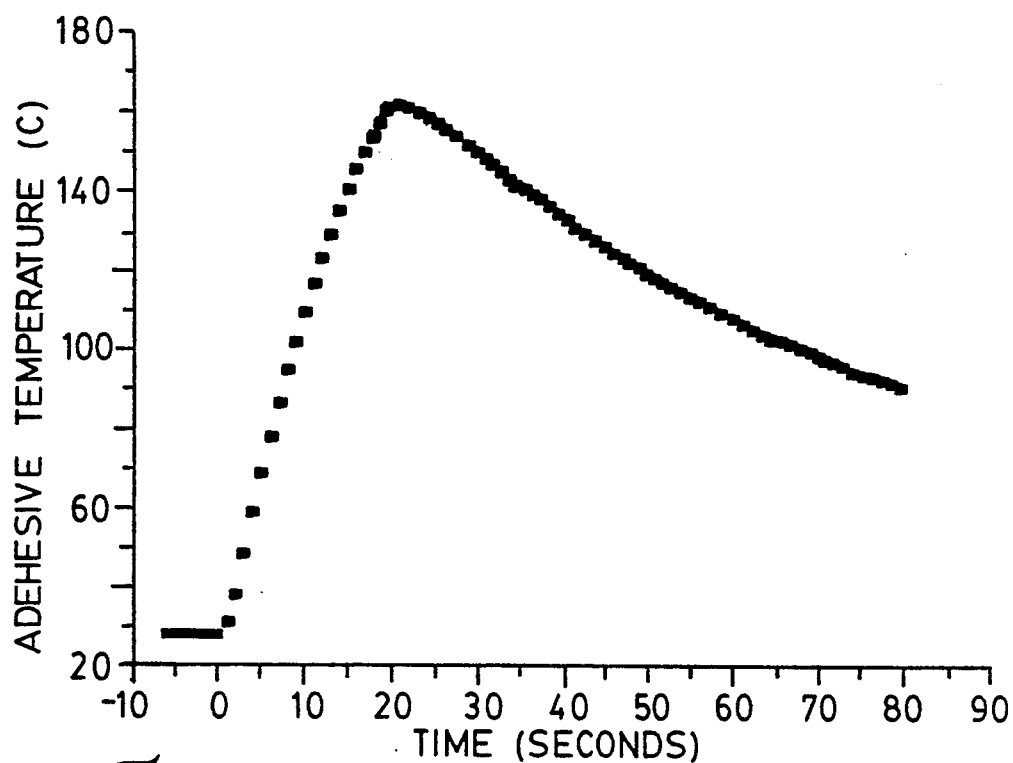
FIG. 7 is a graph of temperature verses time for a urethane adhesive subjected to an electric field.
Figure 8:
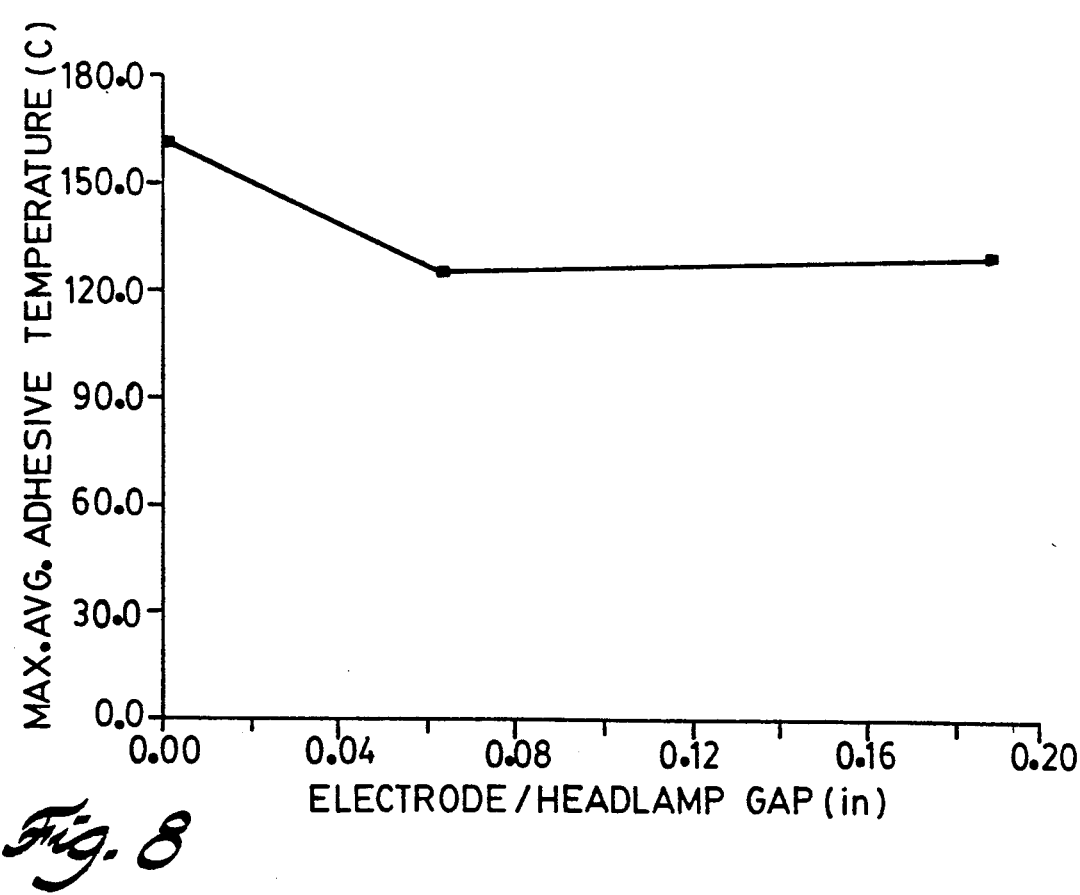
FIG. 8 is a graph of maximum temperature rise verse the amount of staggering (d) when an electrode is moved a distance away from vertical alignment.

FIG. 7 is a graph of temperature verses time for a urethane adhesive UR4510 manufactured by H.B. Fuller when subjected to an electric field of 27.12 Hz, 5700 volts, for 20 seconds beginning from room temperature. FIG. 8 is a graph of maximum temperature rise verse the amount of staggering (d) when segmented electrode 16 as shown in FIG. 3 is moved a distance away from reflector 12 between d =0 and d =0.2 inches. This fringe electric field is weaker than the electric field directly between the electrodes. The fringe electric field remains strong enough to heat the adhesive and achieve at least a partial cure.

The invention has been described in terms of bonding a thermoplastic reflector to a thermoplastic lens. The invention is usable for bonding a wide variety of materials including thermosets, ceramics, glass, metal, wood and cloth. For example, automotive glass could be rapidly bonded to plastic for manufacturing modular vehicle windows. The heating rate of a material in a Radio Frequency (RF) electric field heats primarily the adhesive layers. When joining inorganic members such as glass or ceramic components, the low dielectric loss and low thermal conductivity of the typical glass or ceramic materials make RF dielectric bonding ideal for such applications. It is important to control the duration and the strength of the RF exposure such that the heat generated in the adhesives does not raise the temperature of the thermoplastic member above the temperature at which it distorts. When bonding plastic materials with relatively high dielectric loss, it is possible to control the dielectric heating so that the adhesive heats much faster than the surrounding materials by choosing an adhesive containing dielectric loss enhancers (high polarity additives formulated in the adhesives). Typical dielectric loss enhancers include halogenated organic compounds and ionic compounds which can be incorporated in the adhesive formulation.

While certain representative embodiments have been shown for purposes of illustrating the invention, it will be apparent to those skilled in the art the various changes in the methods and apparatus described herein and may be made without departing from the scope of the invention, which is defined by the appended claims.

What is claimed:

1. A method of bonding a first member to a second member, said first member having structural portions overlying mating surfaces of said first and second members comprising the steps of:
   providing a segmented electrode, said segmented electrode having two or more pieces, said pieces being movable between an open and closed position;
   applying adhesive between said mating surfaces;
   opening said segmented electrode and placing said first member between said open pieces;
   closing and electrically connecting said pieces so that said segmented electrode becomes integral, said segmented electrode is adjacent said structural portions and closely conforms to the perimeter of said first member; and
   applying a high frequency electric field between said segmented electrode and a second electrode sufficient to dielectrically heat said adhesive.

2. The method of claim 1 wherein said second electrode is placed adjacent said second member.

3. The method of claim 1, wherein said first member is a reflector and said second member is a lens.

4. The method of claim 1, wherein said first and second members are plastic.

5. The method of claim 1, wherein said electrodes direct a fringe electric field through said adhesive.

6. An apparatus for bonding a first member to a second member, said first member having structural portions overlying mating surfaces of said first and second members comprising:
   a segmented electrode having two or more pieces, said pieces being movable between an open and closed position, said segmented electrode spaced adjacent said structural portions of said first member when said pieces are in the closed position and said pieces being electrically connected and integral when in the closed position;
   means for moving said pieces between the open and closed positions;
   a second electrode parallel with said segmented electrode; and
   one or more high frequency generators connected between said segmented and second electrode, said generator supplying a high frequency electric field which is sufficient to heat a dielectrically heatable adhesive positioned between said mating surfaces.

* * * * *